Sept. 9, 1958  J. STONE ET AL  2,851,222
HEATING CONTROL SYSTEMS
Filed Nov. 2, 1953  3 Sheets-Sheet 2
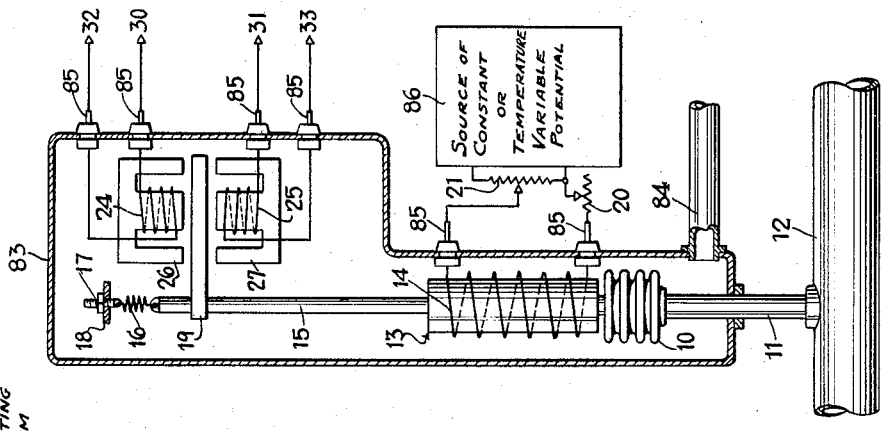
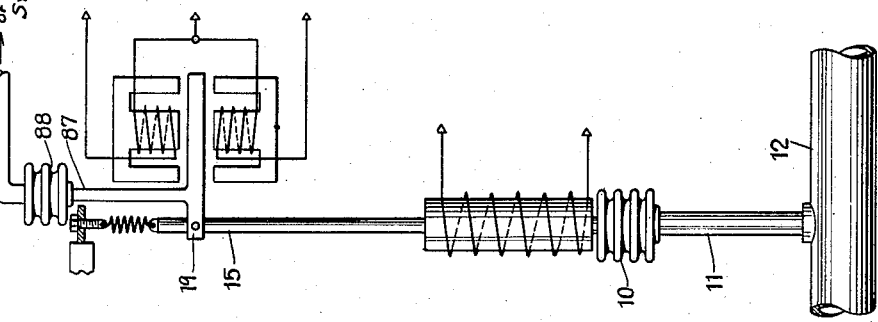
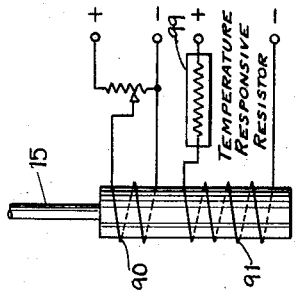
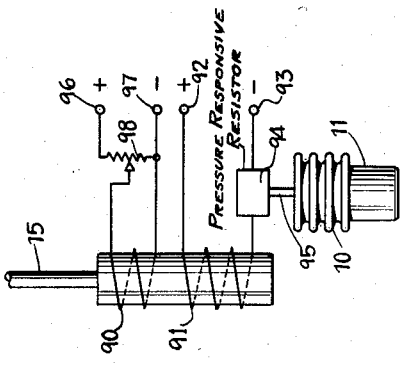
INVENTORS.
JOHN STONE.
BY JAMES E. TOLAN.
ATTORNEYS.

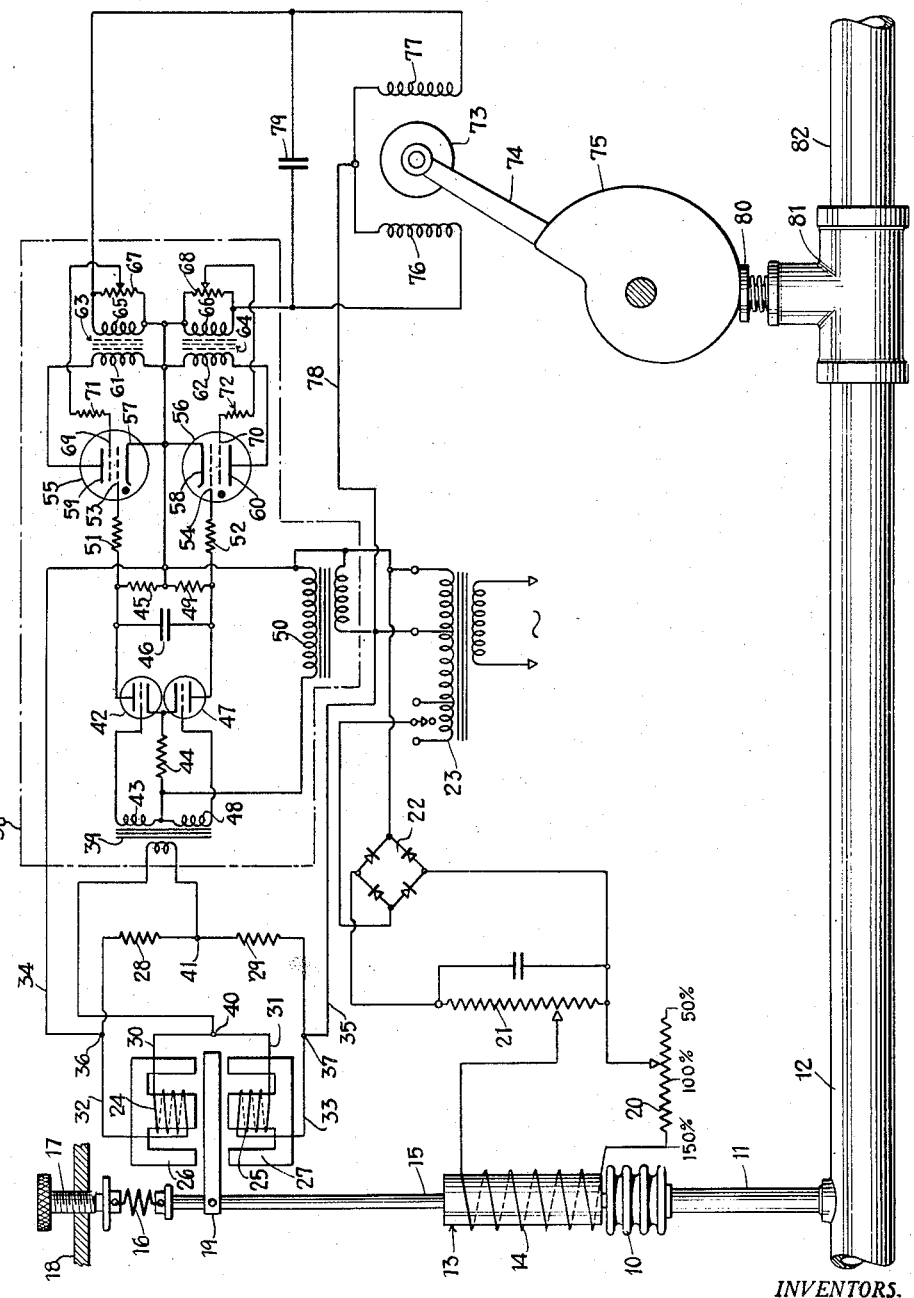

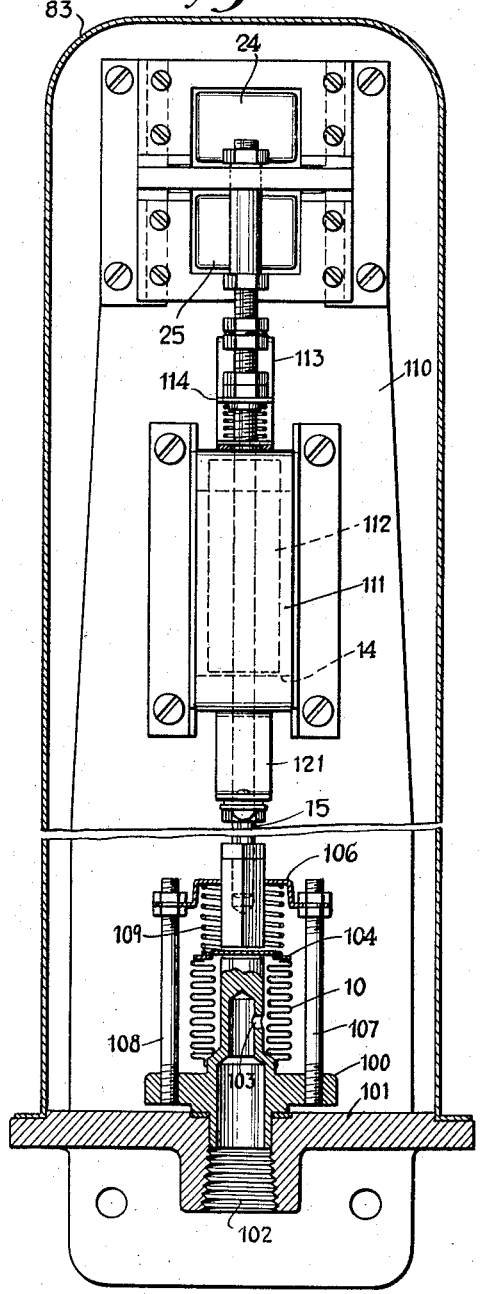
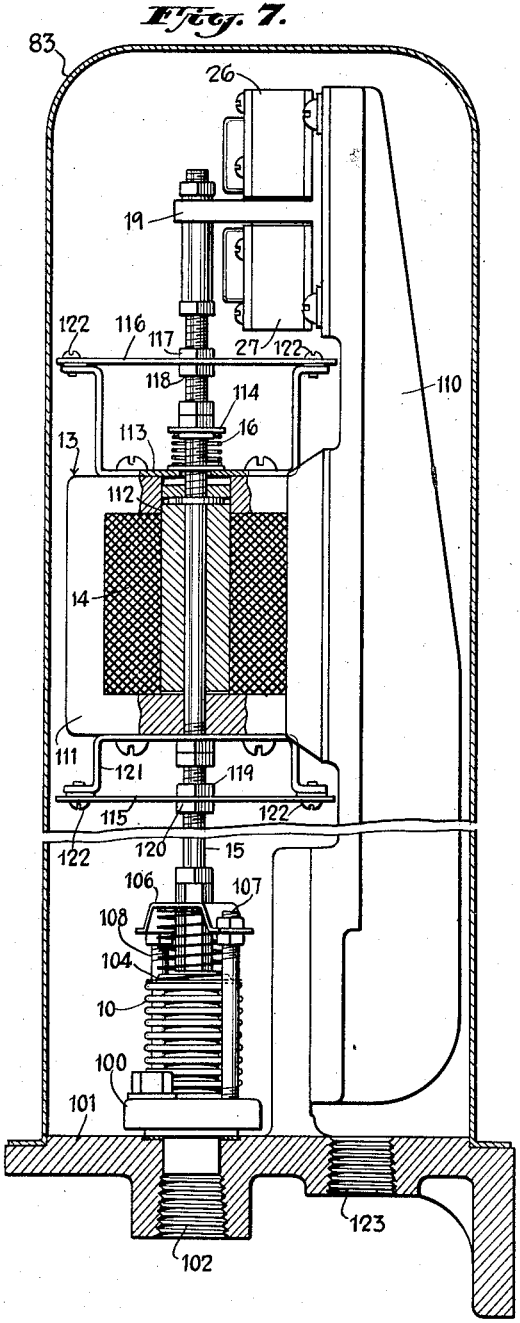

United States Patent Office 2,851,222
Patented Sept. 9, 1958

2,851,222

HEATING CONTROL SYSTEMS

John Stone, Merchantville, N. J., and James E. Tolan, Narberth, Pa., assignors to Warren Webster & Company, Camden, N. J., a corporation of New Jersey Application November 2, 1953, Serial No. 389,773

21 Claims. (Cl. 237—9)

The present invention relates to control systems and particularly to heating control systems for controlling a characteristic of a fluid, e. g., its temperature, pressure, or rate of flow, so as to provide the desired amount of heat in heat-radiating apparatus.

Heating systems in which heat is transferred from a source, such as a boiler, to heat-radiating apparatus by means of a fluid, e. g., steam or water, are well known, and it is customary to control the transfer of the heat by controlling the temperature, pressure or rate of flow of the steam or the temperature or rate of flow of the water. Thus, the temperature in a building, for example, may be controlled by regulating the apparatus which varies these characteristics of the fluid supplied to the radiating apparatus.

The regulating or control system should be as inexpensive as possible, but at the same time it must be reliable and rugged. Accordingly, the system should have no electrical contacts which are operated by the controlling condition and should be stable as well as closely resettable. In addition, it should be adjustable by an unskilled operator and highly sensitive without the use of a large number of parts or mechanical or electrical amplifiers.

The control system of the invention has the aforesaid desirable features and includes a device which produces a force which varies with a physical condition, such as temperature, pressure, rate of flow of a fluid, etc., a pair of impedance members and a further member mounted adjacent said impedance members so as to affect the impedance values thereof when relative movement is produced between said further member and said impedance members, relative movement therebetween being caused by connecting said device to one of said members.

Preferably, the further member is mounted with respect to the impedance members so that movement of the further member toward one impedance member increases the magnitude of the impedance of said one member and decreases the magnitude of the impedance of the other impedance member and vice versa and so that the impedance members may be connected in the adjacent arms of a bridge circuit including a further pair of impedance members. The use of a bridge circuit provides a means for indicating not only the magnitude of the aforesaid relative movement but also the direction of the movement.

The bridge circuit is connected to a phase-sensitive amplifier which, in order to provide a maximum output with a minimum number of amplifier stages, includes a pair of reactor controlled electronic circuits of the type shown and described in my United States Patent No. 2,614,242.

The output of the amplifier is used to control a bi-directional motor means which operates in a direction determined by the direction of unbalance of the aforesaid bridge circuit and hence the direction of relative movement. The motor means regulates the apparatus which varies the particular characteristic of the fluid which it is desired to control.

In the preferred form of the invention, the physical condition responsive device is connected to said further member by the plunger of an electromagnet, the energizing coil of which may be used to set the balance conditions of the control system and hence the difference between the rate of heat flow when the control system turns off and the rate of heat flow when the control system turns on.

Also, in the preferred embodiment of the invention the aforesaid plunger supports said further member and is supported by a pair of flexible, resilient strips which are fixedly held at their ends. In this manner a highly stable unit which maintains its performance over long periods of time is obtained, the strips maintaining the plunger and the further member in a fixed path of movement and applying uniform, proportional forces to the plunger as it moves.

My invention may be better understood by referring to the following detailed description of specific embodiments of the invention, given by way of example only, and setting forth the manner in which I now prefer to practice the invention, and to the accompanying drawings in which:

Fig. 1 illustrates diagrammatically one embodiment of the invention in which the invention is employed to control the pressure of a heating fluid in the heat-radiating portion of a heating system;

Fig. 2 illustrates diagrammatically a modification of a portion of the apparatus shown in Fig. 1;

Fig. 3 illustrates diagramamtically a further modification of a portion of the apparatus shown in Fig. 1;

Figs. 4 and 5 illustrate diagrammatically modifications which may be employed in place of a portion of the apparatus shown in Fig. 1;

Figs. 6 and 7 are, respectively, front and side elevation views, partly in cross-section, of the apparatus illustrated diagrammatically in Fig. 2 and which may be used as part of the apparatus shown in Fig. 1.

Referring to Fig. 1, which illustrates the use of the invention in connection with the control of the steam pressure in a low-pressure line forming part of heat-radiating apparatus, a pressure-responsive device in the form of a bellows 10 is connected through a pipe 11 to the low-pressure line 12. Thus, as the pressure of the steam in the line 12 varies, the bellows 10 expands and contracts. An electromagnet 13 having an energizing coil 14 and a plunger 15 is mounted adjacent the bellows 10 so that the end of the plunger 15 is in contact with the end of the bellows 10. The opposite end of the plunger 15 is connected to a spring 16 which is adjustably mounted by means of screw 17 on a fixed support 18, and a magnetic member 19 is mounted on the plunger 15 and is movable therewith. Member 19 is made of a magnetic material and preferably is made of soft iron.

The spring 16 exerts an upward pull on the plunger 15 to overcome the force of gravity upon the mass of the plunger assembly 15 and 19. The coil 14 is electrically energized through a variable resistor 20, a potentiometer 21 and a bridge rectifier 22 which is connected to transformer 23 whose primary is connected to any suitable source of alternating current energy. When coil 14 is energized, it pulls the plunger 15 downward against the end of bellows 10 and thus the force applied to the plunger 15 by the coil 14 opposes the upward force applied to the plunger 15 by the spring 16.

A pair of impedance members having windings 24 and 25 and cores 26 and 27 are mounted with their cores adjacent the member 19 and on opposite sides of the member 19 so that as the member 19 moves toward the core 26 the value of the impedance of winding 24 increases, whereas the value of the impedance of the winding 25 decreases. Conversely, as the member 19 moves toward the core 27, the impedance value of coil 25 increases, whereas the impedance value of the winding 24 decreases. It will thus be seen that as the bellows 10 expands with increase in steam pressure in line 12, the plunger 15 is moved against the force applied thereto by the coil 14 and causes the member 19 to move toward the core 26, whereas when the bellows 10 contracts due to a decrease in the stream pressure in line 12 the member 19 moves toward the core 27.

The windings 24 and 25 of the impedance members are connected in a bridge circuit with a pair of impedances in the form of resistors 28 and 29. Thus, the adjacent ends of windings 24 and 25 are connected together by lines 30 and 31 and the opposite ends of the windings 24 and 25 are connected to the resistors 28 and 29 by lines 32 and 33. Alternating current energy from transformer 23 is supplied over lines 34 and 35 to a pair of diagonally opposite points 36 and 37 on the bridge circuit.

A phase-sensitive amplifier system 38 has its input transformer 39 connected to a pair of points 40 and 41 which are conjugate to the points 36 and 37. Thus, when the bridge circuit is in balance there is no potential difference between the points 40 and 41, whereas when the bridge circuit is unbalanced in a first direction a first voltage having a first phase is developed between the points 40 and 41 and when the bridge circuit is unbalanced in the opposite direction a second voltage having an opposite phase is developed between the points 40 and 41. The phase-sensitive amplifier system 38 is differently responsive to the first and second voltages and provides as its output a first electrical signal when the first voltage is developed between points 40 and 41 and a second electrical signal when the second voltage is developed across the points 40 and 41.

The amplifier system 38 comprises a pair of amplifiers having their input and output circuits connected in push-pull. One of the amplifiers includes the vacuum tube 42, one winding 43 of transformer 39, cathode biasing resistor 44, plate load resistor 45 and the capacitor 46. The other amplifier includes the vacuum tube 47, winding 48, cathode biasing resistor 44, plate load resistor 49 and capacitor 46. The cathode resistor 44, the plate load resistors 45 and 49 and the capacitor 46 form the output circuits for the two amplifiers, and alternating current energy in the same phase as the alternating current energy supplied to the points 36 and 37 on the bridge circuit is supplied to the output circuits of the amplifiers by means of the transformer 50, the primary winding of the transformer 50 being connected to the transformer 23.

The output circuits of the amplifiers are connected through a pair of current-limiting resistors 51 and 52 to the control grids 53 and 54 of a pair of gas tubes 55 and 56. The cathodes 57 and 58 are connected to the junction point between the resistors 45 and 49 and the anodes or plates 59 and 60 are connected to the primary windings 61 and 62 of a pair of saturable core transformers 63 and 64, the output signals of the amplifier system 38 being provided at the secondary windings 65 and 66 of the transformers 63 and 64. The secondary windings 65 and 66 are shunted by potentiometers 67 and 68 whose movable arms are connected respectively to screen grids 69 and 70 of tubes 55 and 56 through current-limiting resistors 71 and 72.

The portion of the amplifier system 38 comprising the gas tubes 55 and 56 is substantially the same in operation as the reactor control electronic circuit described in my Patent No. 2,614,242. Accordingly, when a voltage of sufficient magnitude and the correct phase is supplied to the grids of one of the tubes 55 and 56, the tube to which it is supplied becomes conducting causing saturation of the core of the transformer associated therewith and reducing the impedance of the secondary winding. Potentiometers 67 and 68 provide sufficient feed-back to the screen grids 71 and 72 to maintain the gas tube conducting at a predetermined level when the voltage applied to the control grid of the tube exceeds the level required to initially fire the tube.

The vacuum tubes 42 and 47 and the operating conditions for these tubes as determined by the magnitude of the voltage supplied by the transformer 50 as well as cathode resistor 44 and plate resistors 45 and 49 are selected so that when the aforementioned bridge circuit is balanced the voltages across the resistors 45 and 49 are of such relative valve that the junction between resistors 45—51 and 49—52 is negative with respect to the cathodes 57 and 58. This negative voltage on grinds 53 and 54 augmented by the adjustable negative bias on grids 69 and 70 prevents the tubes 55 and 56 from firing. When the bridge circuit becomes unbalanced, voltages will develop across windings 43 and 48 and because of the push-pull connection will cause the voltage across one of the resistors 45 and 49 to increase and the voltage across the other of the resistors to decrease. A decrease in the voltage across resistor 45 causes tube 55 to conduct and a decrease in the voltage across resistor 49 causes tube 56 to conduct. Similarly, when the bridge circuit is unbalanced in the opposite direction, the voltage across the resistor 49 will decrease and the voltage across the resistor 45 will increase causing the tube 56 to conduct.

A bi-directional motor means comprising a rotor 73 having a shaft 74 connected thereto on which is mounted a cam 75, and a pair of electrically energizable windings 76 and 77 is connected to the output of the amplifier system 38. One end of the winding 76 is connected to one end of the winding 77 and the junction point is connected by line 78 to a first point on the transformer 23 and the opposite ends of the windings 76 and 77 are connected to the ends of the secondary windings 65 and 66. The windings 76 and 77 are shunted by capacitor 79 and one end of secondary winding 66 is connected to one end of secondary winding 65 as well as to a second point on the transformer 23.

When winding 76 is energized, the rotor 73 rotates in one direction and when the winding 77 is energized, the rotor 73 rotates in the opposite direction. The power requirements of the windings 76 and 77 to produce rotation of the rotor 73 are such that when the cores of the transformers 63 and 64 are unsaturated the impedance values of the secondary windings 65 and 66 do not permit sufficient current to flow in the windings 76 and 77 to cause rotation of the rotor 73. However, when the core of the transformer 63 is saturated because the tube 55 is conducting, the impedance of the winding 65 is reduced sufficiently to permit enough current to flow in the winding 77 to cause the rotor 73 to rotate. Similarly, when the core of transformer 64 is saturated because tube 56 is conducting, the impedance of the winding 66 is reduced and sufficient current flows in the winding 76 to cause the rotor 73 to rotate.

In the embodiment shown, the cam 75 bears against the stem 80 of the pressure-reducing valve 81 and, therefore, as rotor 73 rotates, the setting of the valve 81 is changed and the difference in pressure between the steam in the high-pressure line 82 and the low-pressure line 12 is varied.

For the purpose of describing the operation of the embodiment shown in Fig. 1, it will be assumed that steam under pressure is supplied to the line 82 from a suitable source such as a boiler and the valve 81 is held in such a position by the cam 75 that either no steam or steam below the desired pressure is received by the line 12. The arm of the variable resistor 20 is set to the middle or 100% position and the arm of the potentiometer 21 is adjusted upwardly from the lower end until the member 19 is pulled close enough to the core 27 to cause one of the tubes 55 and 56 to conduct and the rotor 73 to rotate. The connections of the windings 76 and 77 to the output of the amplifier system 38 are such that the rotor 73 under these conditions will rotate in a direction which will cause the cam 75 to "open" the valve and thereby increase the pressure of the steam received by the line 12. As the pressure of the steam in the line 12 increases, bellows 10 expands and moves the member 19 upwardly away from the core 27 and toward the core 26. At a position of the member 19 intermediate the cores 26 and 27 the bridge circuit will be balanced, both of the tubes 55 and 56 will be non-conducting and the rotor 73 will stop.

If the position to which the rotor 73 and hence the cam 75 have moved is such that the valve 81 is opened more than is required to provide the desired steam pressure in the line 12, expansion of the bellows 10 will move the member 19 close enough to the core 26 to cause the bridge circuit to become unbalanced and hence cause the other of the tubes 55 and 56 to conduct and rotate the rotor 73 and hence the cam 75 in a direction such that the valve 81 will move toward its "closed" position. In this manner the steam pressure in the line 12 will be reduced.

After the system has stabilized, the pressure in the line 12 can be determined by any suitable measuring equipment and, if the pressure is not exactly the pressure desired, the arm of the potentiometer 21 may be moved in an upward direction to increase the pressure or in a downward direction to decrease the pressure.

The variable resistor 20 is provided primarily to permit an unskilled operator to adjust the pressure in the line 12 within predetermined limits, the resistor 20 varying the energization of the coil 14 and the force exerted by the plunger 15. Thus, with the arm of the variable resistor 20 in the 100% position, the pressure in the line 12 will be that set by the arm of the potentiometer 21, the arm of the potentiometer 21 normally being inaccessible except to a skilled mechanic. If it is desired to increase the pressure in the line 12 by a fixed amount and hence to increase the temperature in the enclosure being heated by the heat-radiating apparatus of which the line 12 forms a part, then the arm of the variable resistor 20 is moved toward the end of the resistor 20 marked in Fig. 1 "150%." Conversely, if it is desired to reduce the temperature and hence the steam pressure in the line 12, the arm of the resistor 20 is moved toward the end marked "50%."

Although the potentiometer 21 has been shown connected to a source of constant potential, it may, as hereinafter described, be connected to a source of potential which varies in accordance with some condition such as temperature. For example, if it is desired to vary the pressure of the line 12 in accordance with the temperature of the enclosure, the potentiometer 21 would be connected to a source of potential whose magnitude decreases with increases in temperature, such sources being well known to those skilled in the art.

Although the bellows 10 shown in Fig. 1 has been described as expanding and contracting because of the pressure of the steam in the line 12, it will be apparent that the bellows 10 may be temperature responsive and hence be caused to contract and expand as a result of the temperature of the steam in the line 12. Thus, although steam would be introduced within a chamber inside of the bellows 10 by the line 11 as described hereinafter, the bellows 10 would not be subjected directly to the steam and hence would not be moved because of the steam pressure.

Also, it will be apparent to those skilled in the art that, although the system shown in Fig. 1 has been described as a steam-heating system, the fluid used to transfer the heat from the source to the heat-radiating apparatus could be a liquid when the bellows 10 is temperature responsive.

It will be noted that the bellows 10 shown in Fig. 1 is caused to operate by virtue of the difference between the pressure in the steam in line 12 and the pressure of the atmosphere. If it is desired to make the system operate because of a difference in pressure between two portions of the heating system, such as the difference between the pressures in the input and return lines of the heat-radiating apparatus, the arrangement shown in Fig. 2 may be employed and is preferred for this type of operation, particularly if it is difficult to obtain a pair of matching bellows for the system described hereinafter in connection with Fig. 3.

In this figure, the bellows 10, electromagnet 13 with its associated plunger 15, spring 16, member 19 and the pair of impedance members comprising the windings 24 and 25 and the cores 26 and 27 are shown mounted within a housing 83 which is gas-tight except for the opening for the inlet line 84. Electrical connections to the windings 24 and 25 and to the coil 14 may be made by means of the terminals 85 extending through the housing 83 and the external electrical circuits may be the same as those shown in Fig. 1. In addition, the motor means would control the pressure of the steam supplied to the line 12 in the manner set forth in Fig. 1. However, as illustrated diagrammatically by the rectangle 86 shown in Fig. 2, the coil 14 may be connected to a source of constant potential of the type shown in Fig. 1 or it may be connected to a source of temperature-variable potential as described above.

In the arrangement of Fig. 2 the bellows 10 is caused to expand and contract because of a difference in pressure between the steam in the line 12 supplied to the interior of the bellows 10 and the pressure of steam supplied to the interior of the housing 83 by the line 84. The line 84 may, for example, be connected to the return line of the heat-radiating apparatus.

To avoid the need for a gas-tight housing surrounding the aforesaid components of the system and also to avoid exposing the electrical components to a fluid, the pressure-responsive, impedance controlling apparatus may be constructed as shown diagrammatically in Fig. 3. In this figure the member 19 is positioned by the plunger 15 and by a shaft 87 connected to a second bellows 88 whose expansion and contraction is controlled by the fluid supplied to the interior thereof by the line 89. The force applied to the member 19 by the bellows 88 is opposite in direction to the force applied thereto by the bellows 10 so that the position of the member 19 is determined by the difference in pressure or temperature between the fluid supplied to the bellows 10 and the fluid supplied to the bellows 88. The apparatus of Fig. 3 may be substituted for the corresponding impedance controlling apparatus shown in Fig. 1.

Although the embodiments of the invention shown in Figs. 1-3 are preferred because it has been found that they provide high stability and sensitivity, the impedance controlling apparatus may be replaced by the apparatus shown in Figs. 4 and 5. In Fig. 4 the plunger 15 is controlled jointly by a biasing coil 90 and a control coil 91. The terminals 92 and 93 are connected to a source of constant potential and the coil 91 is connected to these terminals in series with a pressure-responsive resistor 94. The magnitude of the resistance of resistor 94 is varied by the rod 95 connected to the bellows 10 so that as the bellows 10 expands the plunger 15 is moved in an upward direction so as to move the member 19 connected to the plunger 15 in the same direction that it would be moved if it were connected directly to the bellows 10. As will be apparent, the direction of movement of the plunger 15 is determined by the direction of winding of the coil 91 and the polarity of the voltage applied to the terminals 92 and 93 and, therefore, the magnitude of the resistance of the resistor 94 may be either increased or decreased by the bellows 10 upon expansion thereof depending upon the manner of winding of the coil 91 and the polarity of the potential supplied to the terminals 92 and 93.

The coil 90 is provided so as to control the position of the plunger 15 in the manner in which it was controlled by the coil 14 in Fig. 1 and for this purpose the coil 90 is connected to terminals 96 and 97 through a potentiometer 98, the terminals 96 and 97 in turn being connected to a source of constant potential.

In Fig. 5 the plunger 15 is controlled in position by biasing coil 90 and control coil 91 but the current in the coil 91 is varied by means of a temperature-responsive resistor 99. The resistor 99 is a conventional resistor whose resistance value varies in accordance with the ambient temperature or in accordance with the temperature where it is located and, therefore, the current flowing in the coil 91 is varied in accordance with such temperature causing the plunger 15 to change its position and to operate the control apparatus in the manner set forth in connection with Fig. 1.

In order to obtain the high stability and sensitivity which is characteristic of the apparatus shown in Figs. 1 and 2, I have found that it is important to observe certain precautions in the physical arrangement and construction of the apparatus used to control the impedance values of the impedance members forming part of the bridge circuit. With the apparatus shown in Figs. 1 and 2, it has been found to be possible to maintain stable operation over long periods of time and the sensitivity of the apparatus is such that a movement of 7 to 10 thousandths of an inch of the member 19 will sufficiently unbalance the bridge to cause the motor means to operate. A movement of this order of magnitude can be obtained with a change of pressure in the line 12 of the order of one-tenth of a pound.

The preferred mounting arrangement of the impedance controlling apparatus of the invention is shown in Figs. 6 and 7. In these figures the bellows 10 is shown mounted on a flanged fitting 100, the fitting 100 being secured in a gas-tight manner to the support 101 which has an opening 102 therein with threaded walls for receiving the pipe 11. The bellows 10 is restricted so that it never attains its free length and is sealed at its lower end to the fitting 100 and receives steam therein through the opening 103 in the fitting 100. If the bellows 10 is to be temperature-responsive rather than pressure-responsive, the opening 103 is omitted. The lower end of the plunger 15 engages the cap 104 on the end of the bellows 10 and passes through an aperture in plate 106 supported from the fitting 100 by a pair of studs 107 and 108. A spring 109 maintains a constant downward pressure on the cap 104 so that bellows 10 always contracts when the pressure is reduced.

The support 101 includes an upwardly extending bracket 110 on which is mounted the electromagnet 13 with its coil 14 and pole-piece 111. The electromagnet 13 is provided with a movable core 112 which is secured to the plunger 15 so that movement of the core 112 causes movement of the plunger 15.

The impedance members with their cores 26 and 27 and windings 24 and 25 are mounted at the upper end of the bracket 110 in close but spaced relationship with respect to the member 19. The spring 16 encircles the plunger 15 and acts between a bracket 113 mounted on the end of the pole-piece 111 and a washer 114 secured to the plunger 15.

A further and important feature of the invention is the manner in which the plunger 15 is movably supported. As shown in Fig. 7, the plunger 15 extends through a pair of flexible, resilient strips 115 and 116 and is secured to said strips intermediate their ends by means of adjustable nuts 117—120. The ends of the strips 115 and 116 are fixedly secured to the bracket 113 and the bracket 121 as by screws 122. These strips not only cause the plunger 15 to follow a predetermined path during its movement, but also provide a restoring force which is proportional to the movement of the plunger 15 as long as the elastic limit of the material of the strips is not exceeded and thus avoids any errors in the system due to deviations from a fixed path or variations in restoring forces such as would be encountered with guides which permit the plunger 15 to slide with respect thereto.

The plunger 15 preferably is made of non-magnetic material at least at that portion thereof adjacent the windings 24 and 25 so that the plunger itself will not affect the impedance values of these windings.

The housing 83 is also mounted on a support 101 and has a gas-tight fit therewith. The support 101 is provided with an opening 123 for the connection of line 84 thereto if it is desired to operate the apparatus as shown in Fig. 2. However, if the apparatus is to operate as shown in Fig. 1, the connection of line 84 may be omitted, and in this case it is also unnecessary to provide a gas-tight fit between the housing 83 and the support 101.

Preferably, the fixed supporting parts and the plunger 15 are made of the same material or of materials having similar co-efficients of expansion so as to avoid errors due to temperature changes or other precautions should be taken to avoid such errors.

Having thus described our invention with particular reference to the preferred form thereof, it will be obvious to those skilled in the art to which the invention pertains, after understanding our invention, that various changes and other modifications may be made therein without departing from the spirit and scope of our invention, as defined by the claims appended hereto.

What is claimed as new and desired to be secured by Letters Patent of the United States is:

1. A control system comprising an electromagnet having an energizing coil and a movable plunger, variable means for supplying electrical energy to said coil and for thereby causing movement of said plunger, further means responsive to a physical condition connected to said plunger for causing movement thereof in response to changes in said condition, control means for controlling said condition and thereby controlling said further means, a pair of impedances each comprising a winding and a magnetic core, a magnetic member mounted on said plunger and movable therewith, said member also being mounted adjacent both the cores of said impedances and causing the magnitudes of said impedances to vary with movement thereof, a further pair of impedances connected in a bridge circuit with said first-mentioned impedances, means for supplying electrical energy to a pair of diagonally opposite points on said bridge circuit, an amplifier system connected to a pair of points on said bridge circuit which are conjugate to said first-mentioned pair of points, said amplifier system being phase-sensitive and having an output providing a first electrical signal when said bridge circuit is unbalanced in a first direction and a second electrical signal when said bridge circuit is unbalanced in a second direction, electrically operable motor means connected to said output, said motor means being differently responsive to said first signal and to said second signal and being connected to said control means for varying the setting thereof.

2. A control system comprising a pressure-responsive device movably responsive to said pressure, control means for controlling the pressure applied to said device, an electromagnet having an energizing coil and a plunger, said plunger being connected to said device, means for supplying electrical energy to said coil, a pair of impedances each comprising a winding and a magnetic core, a magnetic member mounted on said plunger and movable therewith, said member also being mounted adjacent both the cores of said impedances and causing the magnitudes of said impedances to vary with movement thereof, a further pair of impedances connected in a bridge circuit with said first-mentioned impedances, means for supplying electrical energy to a pair of diagonally opposite points on said bridge circuit, an amplifier system connected to a pair of points on said bridge circuit which are conjugate to said first-mentioned pair of points, said amplifier system being phase-sensitive and having an output providing a first electrical signal when said bridge circuit is unbalanced in a first direction and a second electrical signal when said bridge circuit is unbalanced in a second direction, electrically operable motor means connected to said output, said motor means being differently responsive to said first signal and to said second signal and means interconnecting said control means and said motor means for varying said control means under control of said motor means.

3. A control system comprising a pressure-responsive device movably responsive to said pressure, control means for controlling the pressure applied to said device, an electromagnet having an energizing coil and a plunger, said plunger being connected to said device, means for supplying electrical energy to said coil and for thereby causing said plunger to apply a force to said device, a pair of impedances each comprising a winding and a magnetic core, a magnetic member mounted on said plunger and movable therewith, said member also being mounted adjacent the cores of both said impedances and causing the magnitudes of said impedances to vary with movement thereof, a further pair of impedances mounted in a bridge circuit with said first-mentioned impedances, means for supplying alternating current energy to a pair of diagonally opposite points on said bridge circuit, a pair of amplifiers having input and output circuits and connected in push-pull, means for supplying said alternating current energy in said predetermined phase to said output circuits, means connecting said input circuits to a pair of points on said bridge circuit which are conjugate to said first-mentioned pair of points, a pair of gas tubes each having an input and an output, means connecting the input of one of said tubes to one of said output circuits and the input of the other of said tubes to the other of said output circuits whereby one of said tubes is conducting when said bridge circuit is unbalanced in a first direction, the other of said tubes is conducting when said bridge circuit is unbalanced in a second direction, and both of said tubes are non-conducting when said bridge circuit is balanced, motor means having first and second electrically energizable means for operating said motor means in different manners, means connecting said first energizable means to the output of one of said tubes, means connecting said second energizable means to the output of the other of said tubes and means interconnecting said control means and said motor means for varying said control means under control of said motor means.

4. A fluid control system comprising fluid-receiving apparatus, control means connected to said apparatus for controlling a characteristic of the fluid therein, electrically operated motor means connected to said control means for varying the setting of said control means and means for controlling said motor means comprising a pair of impedance members each having a winding and a core, a magnetic member mounted adjacent both the cores of said impedance members and causing the impedance values of said impedance members to vary with relative movement between said impedance members and said magnetic member, means for producing said relative movement comprising a device connected to said apparatus and to one of said impedance and magnetic members and movably responsive to said characteristic of the fluid therein, a pair of impedances connected in a bridge circuit with said first-mentioned impedance members, means for supplying electrical energy to a pair of diagonally opposite points on said bridge circuit, an amplifier system connected to a pair of points on said bridge circuit which are conjugate to said first-mentioned pair of points, said amplifier system being phase-sensitive and having an output providing a first electrical signal when said bridge circuit is unbalanced in a first direction and a second electrical signal when said bridge circuit is unbalanced in a second direction, and means connecting said motor means to said output, said motor means being differently responsive to said first signal and to said second signal and operating said control means in a first manner in response to said first signal and in a second manner in response to said second signal.

5. A fluid control system comprising fluid-receiving apparatus, control means connected to said apparatus for controlling a charactertistic of the fluid therein, electrically operated motor means connected to said control means for varying the setting of said control means and means for controlling said motor means comprising a pair of impedance members each having a winding and a core, a magnetic member mounted adjacent both the cores of said impedance members and causing the impedance values of said impedance members to vary with relative movement between said impedance members and said magnetic member, means for producing said relative movement comprising a device connected to said apparatus and to one of said impedance and magnetic members and movably responsive to said characteristic of the fluid therein, an electromagnet having an energizing coil and a movable plunger, said plunger being connected to said magnetic member, means for supplying electrical energy to said coil and for thereby causing movement of said plunger, a pair of impedances connected in a bridge circuit with said first-mentioned impedance members, means for supplying electrical energy to a pair of diagonally opposite points on said bridge circuit, an amplifier system connected to a pair of points on said bridge circuit which are conjugate to said first-mentioned pair of points, said amplifier system being phase-sensitive and having an output providing a first electrical signal when said bridge circuit is unbalanced in a first direction and a second electrical signal when said bridge circuit is unbalanced in a second direction, and means connecting said motor means to said output, said motor means being differently responsive to said first signal and to said second signal and operating said control means in a first manner in response to said first signal and in a second manner in response to said second signal.

6. A fluid control system comprising fluid-receiving apparatus, control means connected to said apparatus for controlling a characteristic of the fluid therein, electrically operated motor means connected to said control means for varying the setting of said control means and means for controlling said motor means comprising a device connected to said apparatus and movably responsive to said characteristic of the fluid therein, a pair of impedances each comprising a winding and a magnetic core, a magnetic member connected to said device and movable therewith, said member also being mounted adjacent both the cores of said impedances and causing the impedance values of said impedances to vary with movement thereof, a further pair of impedances connected in a bridge circuit with said first-mentioned impedances, means for supplying electrical energy to a pair of diagonally opposite points on said bridge circuit, an amplifier system connected to a pair of points on said bridge circuit which are conjugate to said first-mentioned pair of points, said amplifier system being phase-sensitive and having an output providing a first electrical signal when said bridge circuit is unbalanced in a first direction and a second electrical signal when said bridge circuit is unbalanced in a second direction, and means connecting said motor means to said output, said motor means being differently responsive to said first signal and to said second signal and operating said control means in a first manner in response to said first signal and in a second manner in response to said second signal.

7. A fluid control system comprising fluid-receiving apparatus, control means connected to said apparatus for controlling a characteristic of the fluid therein, electrically operated motor means connected to said control means for varying the setting of said control means and means for controlling said motor means comprising a device connected to said apparatus and movably responsive to said characteristic of the fluid therein, an electromagnet having an energizing coil and a plunger, said plunger being connected to said device, means for supplying electrical energy to said coil and for thereby causing said plunger to apply a force to said device, a pair of impedances each comprising a winding and a magnetic core, a magnetic member mounted on said plunger and movable therewith, said member also being mounted adjacent both the cores of said impedances and causing the impedance values of said impedances to vary with movement thereof, a further pair of impedances connected in a bridge circuit with said first-mentioned impedances, means for supplying electrical energy to a pair of diagonally opposite points on said bridge circuit, an amplifier system connected to a pair of points on said bridge circuit which are conjugate to said first-mentioned pair of points, said amplifier system being phase-sensitive and having an output providing a first electrical signal when said bridge circuit is unbalanced in a first direction and a second electrical signal when said bridge circuit is unbalanced in a second direction, and means connecting said motor means to said output, said motor means being differently responsive to said first signal and to said second signal and operating said control means in a first manner in response to said first signal and in a second manner in response to said second signal.

8. A fluid control system comprising fluid-receiving apparatus, control means connected to said apparatus for controlling a characteristic of the fluid therein, electrically operated motor means connected to said control means for varying the setting of said control means and means for controlling said motor means comprising a pair of devices connected to different portions of said apparatus and movably responsive to said characteristics of the fluid therein, an electromagnet having an energizing coil and a plunger, said plunger being connected to said devices and movable in opposite directions thereby, means for supplying electrical energy to said coil, a pair of impedances each comprising a winding and a magnetic core, a magnetic member mounted on said plunger and movable therewith, said member also being mounted adjacent both the cores of said impedances and causing the magnitudes of said impedances to vary with movement thereof, a further pair of impedances connected in a bridge circuit with said first-mentioned impedances, means for supplying electrical energy to a pair of diagonally opposite points on said bridge circuit, an amplifier system connected to a pair of points on said bridge circuit which are conjugate to said first-mentioned pair of points, said amplifier system being phase-sensitive and having an output providing a first electrical signal when said bridge circuit is unbalanced in a first direction and a second electrical signal when said bridge circuit is unbalanced in a second direction, and means connecting said motor means to said output, said motor means being differently responsive to said first signal and to said second signal and operating said control means in a first manner in response to said first signal and in a second manner in response to said second signal.

9. A fluid control system comprising fluid-receiving apparatus, a fluid control valve connected to said apparatus for controlling the fluid therein, electrically operated motor means connected to said valve for varying the setting of said valve and means for controlling said motor means comprising a device connected to said apparatus and movably responsive to a characteristic of the fluid therein, an electromagnet having an energizing coil and a movable plunger, said plunger being connected to said device, means for supplying electrical energy to said coil and for thereby causing said plunger to apply a force to said device, a pair of impedances each comprising a winding and a magentic core, a magnetic member mounted on said plunger and movable therewith, said member also being mounted adjacent both the cores of said impedances and causing the impedance values of said impedances to vary with movement thereof, a further pair of impedances connected in a bridge circuit with said first-mentioned impedances, means for supply electrical energy to a pair of diagonally opposite points on said bridge circuit, an amplifier system connected to a pair of points on said bridge circuit which are conjugate to said first-mentioned pair of points, said amplifier system being phase-sensitive and having an output providing a first electrical signal when said bridge circuit is unbalanced in a first direction and a second electrical signal when said bridge circuit is unbalanced in a second direction, and means connecting said motor means to said output, said motor means being differently responsive to said first signal and to said second signal and operating said valve in a first direction in response to said first signal and in a second direction in response to said second signal.

10. A fluid control system comprising fluid-receiving apparatus, a fluid control valve connected to said apparatus for controlling the fluid therein, electrically operated motor means connected to said valve for varying the setting of said valve and means for controlling said motor means comprising a pressure-responsive device connected to said apparatus and movable by the fluid therein, an electromagnet having an energizing coil and a movable plunger, said plunger being connected to said device, means for supplying electrical energy to said coil and for thereby causing said plunger to apply a force to said device, a pair of impedances each comprising a winding and a magnetic core, a magnetic member mounted on said plunger and movable therewith, said member also being mounted adjacent both the cores of said impedances and causing the impedance values of said impedances to vary with movement thereof, a further pair of impedances connected in a bridge circuit with said first-mentioned impedances, means for supplying alternating current energy to a pair of diagonally opposite points on said bridge circuit, an amplifier system connected to a pair of points on said bridge circuit which are conjugate to said first-mentioned pair of points, said amplifier system being phase-sensitive and having an output providing a first electrical signal when said bridge circuit is unbalanced in a first direction and a second electrical signal when said bridge circuit is unbalanced in a second direction, and means connecting said motor means to said output, said motor means being differently responsive to said first signal and to said second signal and operating said valve in a first direction in response to said first signal and in a second direction in response to said second signal.

11. A fluid control system comprising fluid-receiving apparatus, a fluid control valve connected to said apparatus for controlling the flow of fluid in said apparatus, electrically operated motor means connected to said valve for varying the setting of said valve, and means for controlling said motor means comprising a pressure responsive device connected to said apparatus and movable by fluid therein, an electromagnet having an energizing coil and a movable plunger, said plunger being connected to said device and movable by said device, means for supplying electrical energy to said coil and for thereby causing said plunger to apply a force to said device, a pair of impedances each comprising a winding and a magnetic core, a magnetic member mounted on said plunger and movable therewith, said member also being mounted adjacent both the cores of said impedances and causing the magnitudes of said impedances to vary with movement thereof, a further pair of impedances connected in a bridge circuit with said first-mentioned impedances, means for supplying alternating current energy to a pair of diagonally opposite points on said bridge circuit, a pair of amplifiers having input and output circuits and connected in push-pull, means for supplying said alternating current energy to said output circuits, means connecting said input circuits to a pair of points on said bridge circuit which are conjugate to said first-mentioned pair of points, a pair of gas tubes each having an input and an output, means connecting the input of one of said tubes to one of said output circuits and the input of the other of said tubes to the other of said output circuits whereby one of said tubes is conducting when said bridge circuit is unbalanced in a first direction, the other of said tubes is conducting when said bridge circuit is unbalanced in a second direction, and both of said tubes are non-conducting when said bridge circuit is balanced, said motor means having first electrically energizable means for operating said motor means and said valve and second electrically energizable means for operating said motor means and said valve, means connecting said first energizable means to the output of one of said tubes, and means connecting said second energizable means to the output of the other of said tubes whereby said valve is operated when either of said tubes is conducting.

12. In a heating system having a source of steam and heat-radiating apparatus connected thereto, a pressure control valve connected intermediate said source and said apparatus, electrically operated motor means connected to said valve for varying the setting of said valve and hence the pressure of the steam in said radiating apparatus, and means for controlling said motor means comprising a bellows connected to said radiating apparatus and movable by steam therein, an electromagnet having an energizing coil and a movable plunger, said plunger being connected to said bellows, means for supplying electrical energy to said coil and for thereby causing said plunger to apply a compressing force to said bellows, a pair of impedances each comprising a winding and a magnetic core, a magnetic member mounted on said plunger and movable therewith, said member also being mounted adjacent both the cores of said impedances and causing the magnitudes of said impedances to vary with movement thereof, a further pair of impedances connected in a bridge circuit with said first-mentioned impedances, means for supplying alternating current energy to a pair of diagonally opposite points on said bridge circuit, a pair of amplifiers having input and output circuits and connected in push-pull, means for supplying said alternating current energy to said output circuits, means connecting said input circuits to a pair of points on said bridge circuit which are conjugate to said first-mentioned pair of points, a pair of gas tubes each having an input and an output, means connecting the input of one of said tubes to one of said output circuits and the input of the other of said tubes to the other of said output circuits whereby one of said tubes is conducting when said bridge circuit is unbalanced in a first direction, the other of said tubes is conducting when said bridge circuit is unbalanced in a second direction, and both of said tubes are non-conducting when said bridge circuit is balanced, said motor means having first electrically energizable means for operating said motor means and said valve and second electrically energizable means for operating said motor means and said valve, means connecting said first energizable means to the output of one of said tubes, and means connecting said second energizable means to the output of the other of said tubes whereby said valve is operated when either of said tubes is conducting.

13. A fluid control system comprising fluid-receiving apparatus, a fluid control valve connected to said apparatus, electrically operated motor means connected to said valve for varying the setting of said valve and means for controlling said motor means comprising a pressure-responsive device connected to said apparatus and movable by the fluid therein, an electromagnet having an energizing coil and a movable plunger, said plunger being connected to said device, means for supplying electrical energy to said coil and for thereby causing said plunger to apply a force to said device, a pair of impedances each comprising a winding and a magnetic core, a magnetic member mounted on said plunger and movable therewith, said member also being mounted adjacent both the cores of said impedances and causing the magnitudes of said impedances to vary with movement thereof, a further pair of impedances connected in a bridge circuit with said first-mentioned impedances, means for supplying alternating current energy to a pair of diagonally opposite points on said bridge circuit, an amplifier system connected to a pair of points on said bridge circuit which are conjugate to said first-mentioned pair of points, said amplifier system being phase-sensitive and having an output providing a first electrical signal when said bridge circuit is unbalanced in a first direction and a second electrical signal when said bridge circuit is unbalanced in a second direction, and means connecting said motor means to said output, said motor means being differently responsive to said first signal and to said second signal and operating said valve in a first direction in response to said first signal and in a second direction in response to said second signal.

14. In a heating system having a source of steam and heat-radiating apparatus connected thereto, a pressure control valve connected intermediate said source and said apparatus, electrically operated motor means connected to said valve for varying the setting of said valve and hence the pressure of the steam in said radiating apparatus, and means for controlling said motor means comprising a bellows connected to said radiating apparatus and movable by steam therein, spring means connected to said plunger and acting against said force, an electromagnet having an energizing coil and a movable plunger, said plunger being connected to said bellows, means for supplying electrical energy to said coil and for thereby causing said plunger to apply a compressing force to said bellows, a pair of impedances each comprising a winding and a magnetic core, a magnetic member mounted on said plunger and movable therewith, said member also being mounted adjacent both the cores of said impedances and causing the magnitudes of said impedances to vary with movement thereof, a pair of resistors connected in a bridge circuit with said impedances, means for supplying alternating current energy in a predetermined phase to a pair of diagonally opposite points on said bridge circuit, a pair of amplifiers having input and output circuits and connected in push-pull, means for supplying said alternating current energy in said predetermined phase to said output circuits, means connecting said input circuits to a pair of points on said bridge circuit which are conjugate to said first-mentioned pair of points, a pair of gas tubes each having an input and an output, means connecting the input of one of said tubes to one of said output circuits and the input of the other of said tubes to the other of said output circuits whereby one of said tubes is conducting when said bridge circuit is unbalanced in a first direction, the other of said tubes is conducting when said bridge circuit is unbalanced in a second direction, and both of said tubes are non-conducting when said bridge circuit is balanced, said motor means having first electrically energizable means for operating said motor means and causing said valve to increase the pressure in said radiating apparatus and second electrically energizable means for operating said motor means and causing said valve to decrease the pressure in said radiating apparatus, means connecting said first energizable means to the output of one of said tubes, and means connecting said second energizable means to the output of the other of said tubes whereby said valve is operated when either of said tubes is conducting.

15. In a heating system comprising fluid-receiving apparatus having a supply end and a return end, the pressure of the fluid normally being higher at the supply end than at the return end, control means connected to the supply end of said apparatus for controlling the pressure of the fluid therein, electrically-operated motor means connected to said control means for varying the setting of said control means and means for controlling said motor means comprising a device connected to the supply and return ends of said apparatus and movable in response to a predetermined difference in the pressures of the fluids at said ends, a pair of impedances each comprising a winding and a magnetic core, a magnetic member connected to said device and movable therewith, said member also being mounted adjacent both the cores of said impedances and causing the impedance values of said impedances to vary with movement thereof, a further pair of impedances connected in a bridge circuit with said first-mentioned impedances, means for supplying electrical energy to a pair of diagonally opposite points on said bridge circuit, an amplifier system connected to a pair of points on said bridge circuit which are conjugate to said first-mentioned pair of points, said amplifier system being phase-sensitive and having an output providing a first electrical signal when said bridge circuit is unbalanced in a first direction and a second electrical signal when said bridge circuit is unbalanced in a second direction, and means connecting said motor means to said output, said motor means being differently responsive to said first signal and to said second signal and operating said control means in a first manner in response to said first signal and in a second manner in response to said second signal.

16. A control system responsive to a difference in pressure between the fluid in a first portion and the fluid in a second portion of fluid-receiving apparatus and adapted to control said difference in pressure, said system comprising control means connected to said apparatus for controlling the pressure of the fluid supplied thereto, electrically-operated motor means connected to said control means for varying the setting of said control means and means for controlling said motor means comprising a device connected to both said portions of said apparatus and movable in response to a predetermined difference in the pressures of the fluid in said portions, a pair of impedances each comprising a winding and a magnetic core, a magnetic member connected to said device and movable therewith, said member also being mounted adjacent both the cores of said impedances and causing the impedance values of said impedances to vary with movement thereof, a further pair of impedances connected in a bridge circuit with said first-mentioned impedances, means for supplying electrical energy to a pair of diagonally opposite points on said bridge circuit, an amplifier system connected to a pair of points on said bridge circuit which are conjugate to said first-mentioned pair of points, said amplifier system being phase-sensitive and having an output providing a first electrical signal when said bridge circuit is unbalanced in a first direction and a second electrical signal when said bridge circuit is unbalanced in a second direction, and means connecting said motor means to said output, said motor means being differently responsive to said first signal and to said second signal and operating said control means in a first manner in response to said first signal and in a second manner in response to said second signal.

17. A control system comprising control means for controlling a physical condition, electrically operable motor means connected to said control means for varying the setting therof, an electromagnet having an energizing coil and a plunger, first condition responsive means movably responsive to said condition and connected to said plunger for causing movement thereof, second condition responsive means for producing an electrical current which varies with said condition, said second means being connected to said coil for causing movement of said plunger with variations in said condition, a pair of impedance members, a magnetic member mounted adjacent both said impedance members, said impedance members and said magnetic member being movable with respect to each other to vary the impedance values of said impedance members, one of said magnetic and said impedance members being connected to said plunger and being movable therewith, and amplifier means connected to said impedance members for producing output signals dependent upon the relative magnitudes of the impedances of said impedance members, said motor means being connected to said amplifier means and controlled by said signals for varying said control means.

18. A control system comprising control means for controlling a physical condition, electrically operable motor means connected to said control means for varying the setting thereof, an electromagnet having an energizing coil and a plunger, condition responsive means movably responsive to said condition and connected to said plunger for causing movement thereof, variable means for producing an electrical current, said variable means being connected to said coil for causing movement of said plunger with variations in said current, a pair of impedance members, a magnetic member mounted adjacent both said impedance members, said impedance members and said magnetic member being movable with respect to each other to vary the impedance values of said impedance members, one of said magnetic and said impedance members being connected to said plunger and being movable therewith, and amplifier means connected to said impedance members for producing output signals dependent upon the relative magnitudes of the impedances of said impedance members, said motor means being connected to said amplifier means and controlled by said signals for varying said control means.

19. A control system comprising control means for controlling a physical condition, electrically operable motor means connected to said control means for varying the setting thereof, an electromagnet having an energizing coil and a plunger, condition responsive means for producing an electrical current which varies with said condition, said last-mentioned means being connected to said coil for causing movement of said plunger with variations in said condition, a pair of impedance members, a magnetic member mounted adjacent both said impedance members, said impedance members and said magnetic member being movable with respect to each other to vary the impedance values of said impedance members, one of said magnetic and said impedance members being connected to said plunger and being movable therewith, and amplifier means connected to said impedance members for producing output signals dependent upon the relative magnitudes of the impedances of said impedance members, said motor means being connected to said amplifier means and controlled by said signals for varying said control means.

20. A control system as set forth in claim 19 wherein said condition responsive means comprises temperature-responsive means for varying said electrical current.

21. A control system as set forth in claim 19 wherein said condition responsive means comprises pressure-responsive means for varying said electrical current.

References Cited in the file of this patent

UNITED STATES PATENTS

| | | |
|---|---|---|
| 1,697,401 | Nagy | Jan. 1, 1929 |
| 2,312,191 | Reader | Feb. 23, 1943 |
| 2,499,665 | Mastas | Mar. 7, 1950 |
| 2,546,657 | Smoot | Mar. 27, 1951 |
| 2,595,165 | Owen | Apr. 29, 1952 |
| 2,661,907 | Wissmiller | Dec. 8, 1953 |